United States Patent [19]

Cunningham

[11] Patent Number: 5,429,335
[45] Date of Patent: Jul. 4, 1995

[54] ARTICLE-HOLDING STRAP ASSEMBLY FOR AUTOMOBILE SUN VISOR

[76] Inventor: Kevin J. Cunningham, 18806 68th Ave. Northeast, Apt. #K203, Bothell, Wash. 98011

[21] Appl. No.: 159,154

[22] Filed: Nov. 30, 1993

[51] Int. Cl.⁶ ............................................. A47B 96/06
[52] U.S. Cl. .................... 248/231.8; 248/689
[58] Field of Search ............ 224/42.42 R; 248/231.8, 248/231.7, 301, 316.7, 316.1, 905, 689

[56] References Cited

U.S. PATENT DOCUMENTS

| | | | |
|---|---|---|---|
| 1,420,027 | 6/1922 | Ehrman et al. | 248/231.8 X |
| 2,149,796 | 3/1939 | Smith | 40/11 |
| 2,517,337 | 8/1950 | Nodle | 224/42.42 |
| 2,531,295 | 11/1950 | Ritchie | 40/11 |
| 2,589,348 | 3/1952 | Diefenbach | 224/42.42 |
| 2,598,029 | 5/1952 | Baldwin | 224/42.42 R |
| 2,685,474 | 8/1954 | Ingram | 224/42.42 R |
| 2,707,072 | 4/1955 | Sims | 224/42.42 R |
| 2,825,467 | 3/1958 | Fernly | 211/89 |
| 2,848,116 | 8/1958 | Odom | 211/89 |
| 2,867,925 | 1/1959 | Botts | 40/10 |
| 5,074,508 | 12/1991 | Powers | 248/291 |
| 5,082,225 | 1/1992 | Nespoli | 248/316.7 |

*Primary Examiner*—Ramon O. Ramirez

[57] ABSTRACT

A strap assembly for holding articles such as road maps against a surface such as an automobile sun visor is held in position by end mounts, each including a looped connector having a flat loop engaged by a loop of the strap end and an eye swiveled on a pivot attached to and extending between a faceplate and a mounting member such as a strip spring clip, a pressure-sensitive adhesive backplate or a suction cup. Decorative overlays can be interchangeably attached to the faceplate such as by pressure-sensitive adhesive, by a slide or by spring clips. The length of the holding strap can be adjusted and held in adjusted condition by spring finger clasps holding the end portions of the strap to form loops.

13 Claims, 3 Drawing Sheets

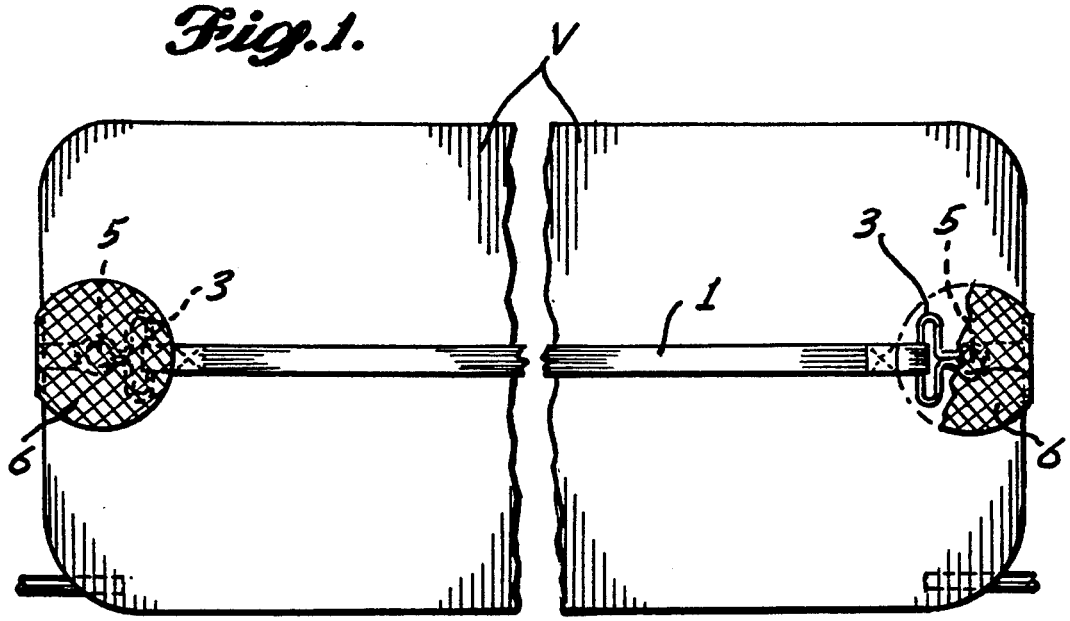
Fig. 1.
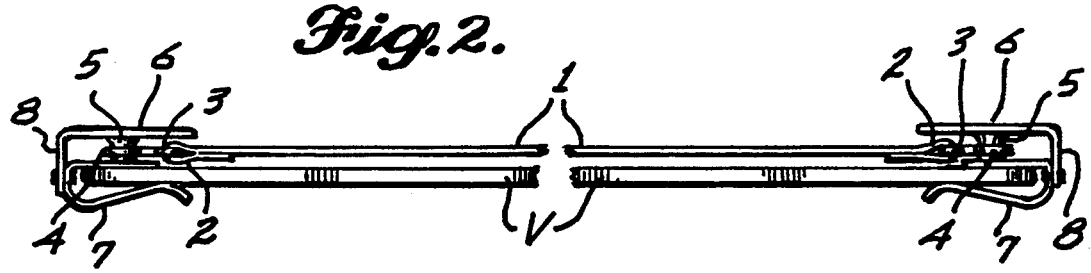
Fig. 2.
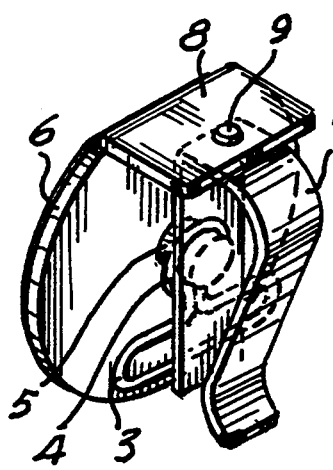
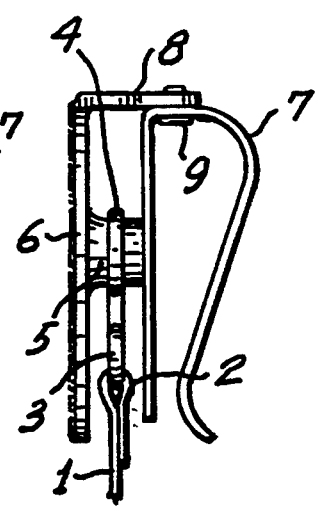
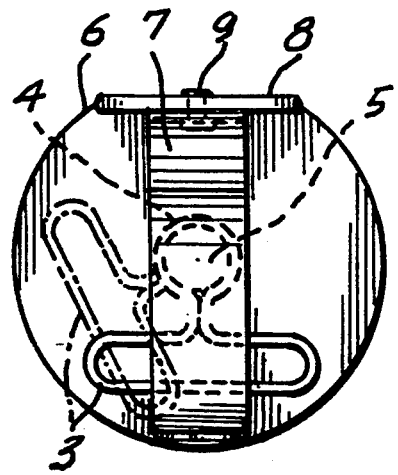
Fig. 3.   Fig. 4.   Fig. 5.

ARTICLE-HOLDING STRAP ASSEMBLY FOR AUTOMOBILE SUN VISOR

BACKGROUND OF THE INVENTION

1. Field Of the Invention

This invention relates to article-holding strap assemblies for application to automobile sun visors, and particularly a strap assembly that will span across a sun visor between its opposite edges and will be held close to the sun visor to confine articles particularly of sheet form between the strap assembly and visor.

2. Prior Art

The following United States patents show holders carried by automobile sun visors to support articles from such sun visors.

The Diefenbach U.S. Pat. No. 2,589,348, issued Mar. 18, 1952, shows parallel springs held to a visor and spanning it lengthwise by hooks engageable with the ends of the sun visor for holding flat paper articles and other small accessories. The hooks for supporting the springs are rather large and clumsy.

Other United States patents showing springs spanning a sun visor lengthwise for holding articles are Fernly U.S. Pat. No. 2,825,467, issued Mar. 4, 1958, and Nodle U.S. Pat. No. 2,517,337, issued Aug. 1, 1950. Smith U.S. Pat. No. 2,149,796, issued Mar. 7, 1939, shows rods connected by a turnbuckle to span a sun visor.

Patents showing various types of clips for attachment to sun visors to hold articles are Ritchie U.S. Pat. No. 2,531,295, issued Nov. 21, 1950, Powers U.S. Pat. No. 5,074,508, issued Dec. 24, 1991, Botts U.S. Pat. No. 2,867,925, issued Jan. 13, 1959, and Odom U.S. Pat. No. 2,848,116, issued Aug. 19, 1958.

SUMMARY OF THE INVENTION

It is a particular object of the present invention to provide a mounting for attaching an article-holding strap assembly to an automobile sun visor which is versatile in that it can be attached readily to sun visors of different size and shape.

Another object is to provide such a mounting which can be attached to a sun visor easily and quickly.

A further object is to provide such a mounting which enables an article-holding strap assembly to be readily adjusted for length and tension.

It is also an object to provide a mounting which is of compact and simple construction, yet which is strong and rugged.

A further object is to provide a mounting which is adaptable for supporting article-holding strap assemblies by attachment to articles other than sun visors, such as an automobile windshield, side window or dashboard.

Another object is to provide a mounting which is attractive in appearance and can easily be provided with interchangeable decorations of different size, shape and composition.

The foregoing objects can be accomplished by providing a mounting for an article-holding strap assembly composed of a loop connector for such strap assembly which is supported for swiveling on a pivot attached to and bridging between a faceplate and a mounting member such as a clip, a suction cup or an adhesive plate and which faceplate preferably has a stabilizing flange and can serve as a support for a decorative overlay.

BRIEF DESCRIPTION OF THE DRAWINGS

FIG. 1 is a side view of an automobile visor to which an article-holding strap assembly according to the present invention is attached, parts being broken away;

FIG. 2 is an edge view of the visor to which the article-holding strap assembly has been applied, parts being broken away;

FIG. 3 is a top perspective of a mount for supporting one end portion of an article-holding strap assembly;

FIG. 4 is an edge elevation of the mount shown in FIG. 3 on an enlarged scale; and FIG. 5 is a back elevation of the mount taken perpendicular to the elevation shown in FIG. 4;

DETAILED DESCRIPTION

Figure 6:
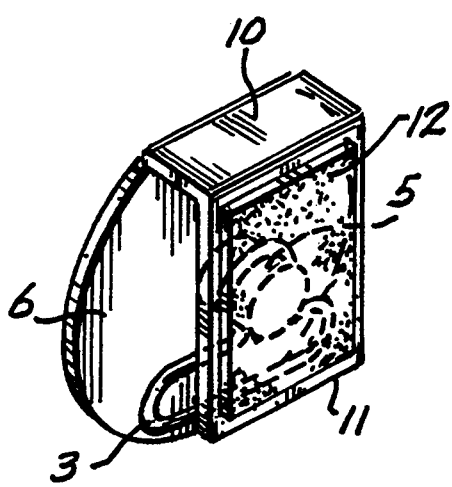
FIG. 6 is a top perspective of a modified type of mount for an end portion of an article-holding strap.

The article-holding strap assembly of the present invention is intended primarily for mounting adjacent and parallel to a surface such as on an automobile sun visor V shown in FIG. 1 with the strap 1 held closely adjacent to the visor surface for enabling articles, particularly flat sheet articles such as maps, to be held against the visor by the strap which overlies such articles. The article-holding strap spans the visor usually from end to end as shown in FIG. 1, although the strap could be inclined diagonally essentially from corner to corner of the visor if preferred.

The end portions of the strap 1 are folded, and each strap end portion is secured to the adjacent portion of the body of the strap to form a loop 2. Such loop is engaged with the flat loop 3 of a looped connector forming one component of a mount for attaching an end portion of the article-holding strap to the edge of the visor. Mounts attached to the opposite end portions of the article-holding strap 1 can be secured to the visor, such as at its opposite ends, to hold the article-holding strap in close proximity to a surface of the visor V. Usually the strap 1 will be resilient, such as being made of elastic webbing or a bungee cord or stretchable plastic so that, when the opposite end portions of the article-holding strap have been anchored in place, the strap will be held in stretched tensioned condition to hold articles against the visor surface more effectively.

FIGS. 2, 3, 4 and 5 show a mount for an end portion of an article-holding strap which can be attached readily to an edge portion of a visor.

The looped connector including the flat loop 3 is one component of the mount, and such connector has an eye 4 spaced from the flat loop 3 which is mounted on pivot 5 for swiveling. One end of the pivot 5 is adhered to a faceplate 6 such as by butt-welding if the pivot 5 and faceplate 6 are metal. Otherwise, adherence can be accomplished by bonding an end of the pivot 5 to the faceplate 6 by a suitable adhesive.

The faceplate 6 is shown as being of generally circular shape, although it could be of any other desirable shape. If this plate is circular, its radius should be greater than any radius of the looped connector, so that in all rotated positions of the looped connector about the pivot 5, such connector will be hidden by the faceplate.

The mount shown in FIGS. 3, 4 and 5 can be attached to the edge portion of a sun visor by a mounting member in the form of a U-shaped strip spring clip 7, one leg of which is adhered to the end of the pivot 5 remote from the faceplate 6. Such spring clip is usually of metal, so that such adherence can be accomplished by butt-welding the end of the pivot 5 to the flat spring clip leg. The spring clip is further supported by attaching its bend or web portion to a flange 8 projecting from one edge of the faceplate 6 by a rivet 9. Such flange is of a length parallel to the faceplate such that, when the clip 7 is engaged with an edge portion of a sun visor, the edge portion of the flange 8 will be substantially in engagement with the edge of the visor so as to prevent skewing of the faceplate and clip relative to the visor.

Figure 7:
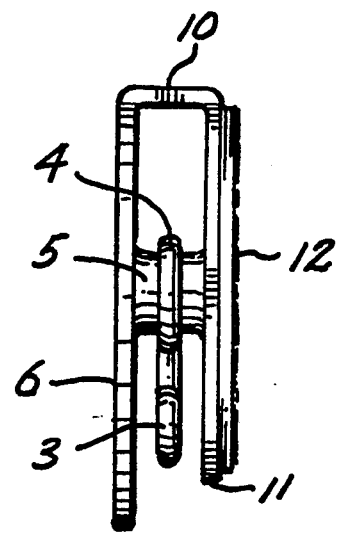
FIG. 7 is an edge elevation of such modified mount on an enlarged scale.

The modified form of strap end mount shown in FIGS. 6 and 7 also includes the looped connector 3,4 mounted on the pivot 5. In this form of mount, however, an angle bracket has been substituted for the flange 8 projecting from the faceplate 6 as shown in FIGS. 3, 4 and 5. In this mount, the mounting member is an angle bracket including the web 10 attached to an edge portion of the faceplate in the same manner as the flange 8, and a backplate 11 integral with the web 10 extending parallel to and spaced from the faceplate 6. The end of pivot 5 remote from the faceplate is adhered to the backplate 11 by welding if such plate is metal, or otherwise by suitable adhesive. To the outer face of the backplate 11 is bonded an adhesive patch 12 having an outer adhesive surface that may be protected initially by a cover patch (not shown) of flexible plastic sheet material as is customary. When such protective patch is removed, the exposed pressure-sensitive adhesive surface of the patch 12 may be pressed against a sun visor, an automobile windshield, a side window of the automobile, or other surface with respect to which surface it is desired to mount an article-holding strap 1. The end portion of such an article-holding strap will be attached to the flat loop 3 of the looped connector 3,4 as described in connection with FIGS. 3, 4 and 5.

Figure 8:
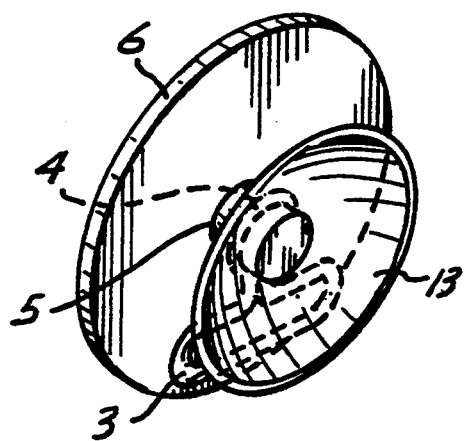
FIG. 8 is a top perspective of a further modification of the mount for an end portion of the article-holding strap.
Figure 9:
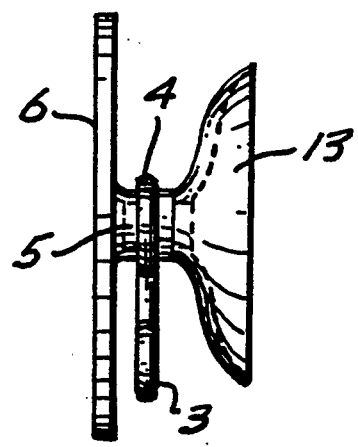
FIG. 9 is an edge elevation of such further modification on an enlarged scale.

FIGS. 8 and 9 illustrate a further modification of the mount for the end portion of an article-holding strap. In this mount, a pivot 5 is still provided for the eye 4 of a looped connector 3,4 to which an end portion of the strap is attached. An end of such pivot is still adhered to one surface of a faceplate 6 as described in connection with the mount shown in FIGS. 3, 4 and 5. In this instance, however, the mounting member is a suction cup 13 which is adhered to the end of pivot 5 remote from faceplate 6 as shown in FIG. 9. Such suction cup could be applied to a sun visor or to any other suitable surface such as a windshield, dashboard or side window of an automobile.

Figure 10:
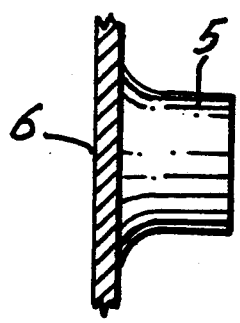
FIG. 10 is an enlarged fragmentary side elevation of a detail of the mount showing the modified construction.

FIG. 10 shows a detail of the mount such as shown in FIG. 4, FIG. 7 or FIG. 9, in which the end of the pivot 5 adhered to the faceplate 6 is flared to provide a larger contact area which is particularly desirable if the end of the pivot is adhered to the faceplate by adhesive rather than by butt-welding. The other end of the pivot adhered to a mounting member could be flared similarly, if desired.

Figure 11:
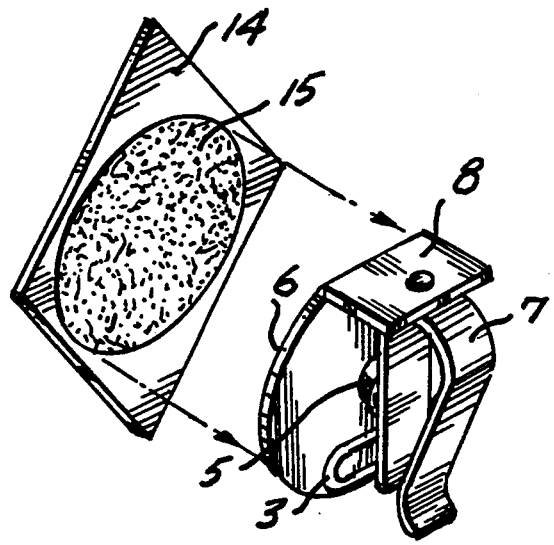
FIG. 11 is a top perspective of an added feature of the mount showing parts in exploded relationship.
Figure 12:
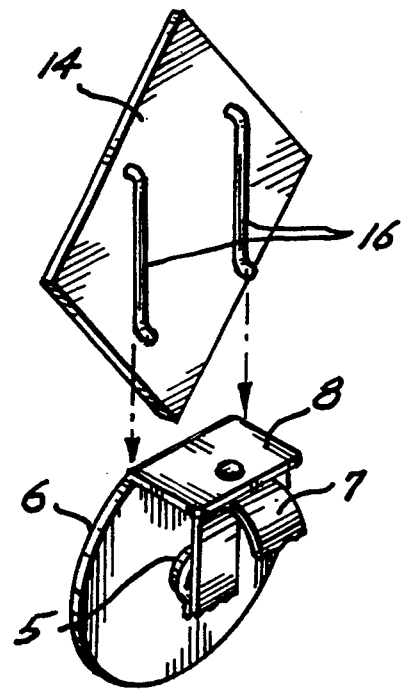
FIG. 12 is a similar top perspective of another modification of the mount showing parts in exploded relationship with parts broken away.
Figure 13:
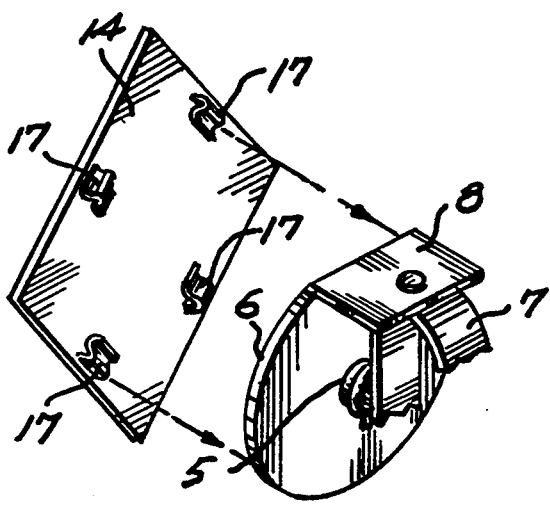
FIG. 13 is still another top perspective of the mount showing a further modification with parts in exploded relationship with parts broken away.

FIGS. 11, 12 and 13 show structures for adding a decorative overlay 14 to the faceplate 6 of the mount. This overlay is shown as being of square shape, but the configuration of the overlay 14 could be of diamond shape, of heart shape, of teardrop shape, of cornucopia shape, or of any other desired artistic shape. Moreover, the outer face of the overlay could be decorated with any desired design.

In FIG. 11, the overlay 14 is shown as being capable of being applied to the outer surface of the faceplate 6 by a pressure-sensitive or permanent adhesive patch 15. If the adhesive is pressure-sensitive, the overlay could be mounted temporarily on the faceplate and interchanged with an overlay of different design as frequently as desired.

The overlay 14 of FIG. 12 has parallel spring fingers 16 attached to its back surface which can be slid over the faceplate 6 at opposite sides of the flange 8, as indicated in FIG. 12.

In FIG. 13, the overlay 14 is shown as being capable of being attached to the faceplate 6 by clips 17 arranged in a circle to snap over the edges of circular faceplate 6.

Figure 14:
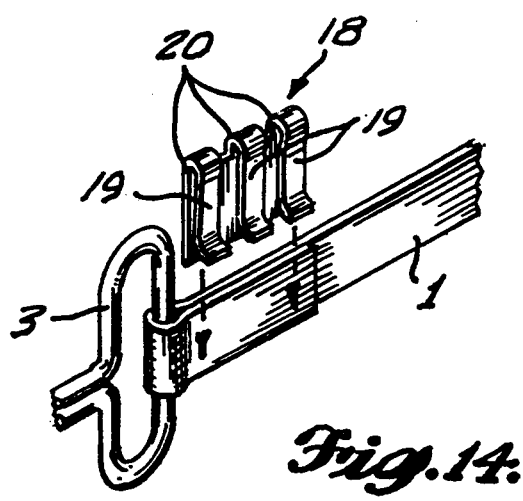
FIG. 14 is a fragmentary top perspective of an end portion of the strap assembly showing an additional type of construction.

FIG. 14 shows a clasp 18 that can be applied to the folded end portion of a strap 1 to form a loop engageable with the flat loop 3 of the connector forming one component of a mount for an end portion of the strap 1. Such clasp has a plurality of spring fingers 19 projecting in cantilever fashion from an edge of a backing plate 20 and extending down over a face of such backing plate. Three such spring fingers are shown in FIG. 14.

The end portion of the fold in strap 1 should be of a length at least equal to the length of the backing plate 20. As indicated in FIG. 14, the spring fingers 19 can be slid edgewise over the doubled end portion of strap 1 to clamp the end portion of such fold to the body portion of the strap which it overlies. Such a clasp can be applied and removed quickly and easily so that the effective length of the strap 1 can be changed readily simply by altering the position of the fold on the strap. The desired length of the strap 1 can thus be selected according to the distance between the strap end mounts and the tension which it is desired to maintain in the strap.

I claim:

1. An article-holding attachment adapted to be mounted adjacent to a surface and including a strap assembly, the improvement comprising mounting means for opposite ends of such strap assembly, each of said mounting means including a loop connector engaged by an end portion of the mounting strap assembly and having an eye, a faceplate, a mounting member spaced from said faceplate, and a pivot extending through said eye of said loop connector and bridging between and having its opposite ends adhered to said faceplate and to said mounting member, respectively.

2. The article-holding attachment defined in claim 1, in which the mounting member includes a suction cup.

3. The article-holding attachment defined in claim 1, in which the mounting member includes an adhesive plate.

4. The article-holding attachment defined in claim 1, in which the mounting member includes a clip securable to an edge portion of an automobile sun visor.

5. The article-holding attachment defined in claim 4, in which the faceplate has an edge flange and the clip is attached to said edge flange.

6. The article-holding attachment defined in claim 5, in which the flange is of considerable length in the direction parallel to the faceplate and is engageable with an edge portion of the sun visor when the clip is applied to such sun visor edge portion.

7. The article-holding attachment defined in claim 1, in which an end portion of the pivot is flared toward the end of said end portion.

8. The article-holding attachment defined in claim 1, and overlay means attachable to the faceplate and overlying the side of the faceplate remote from the pivot.

9. The article-holding attachment defined in claim 8, in which the overlay means includes a plate adhesively bonded to the faceplate.

10. The article-holding attachment defined in claim 8, in which the overlay means includes a plate having clips for securing said plate to the edge of the faceplate.

11. The article-holding attachment defined in claim 8, in which the overlay means includes a plate having slide connector means for connecting said plate to the faceplate.

12. The article-holding attachment defined in claim 1, and clasp means for holding an end portion of the strap in loop form.

13. The article-holding attachment defined in claim 12, in which the clasp means includes a backing plate and three resilient prongs projecting alongside said backing plate in cantilever fashion from one edge of said backing plate at locations spaced lengthwise of said backing plate.

* * * * *